United States Patent Office 3,595,918
Patented July 27, 1971

3,595,918
STABILIZATION OF TOLYLENE DIAMINE
George A. Salensky, Metuchen, N.J., assignor to Union
Carbide Corporation, New York, N.Y.
No Drawing. Continuation-in-part of application Ser. No.
698,140, Jan. 16, 1968. This application Dec. 27, 1968,
Ser. No. 787,554
Int. Cl. C07c 85/16, 87/58
U.S. Cl. 260—578         7 Claims

ABSTRACT OF THE DISCLOSURE

Tolylenediamine stabilized with ascorbic acid to prevent discoloration and staining.

---

This application is a continuation-in-part of my copending application Ser. No. 698,140 filed Jan. 16, 1968.

This invention relates to the stabilization of tolylenediamine by the addition thereto of an ascorbic acid. More particularly, this invention relates to a stabilized tolylenediamine which is excellently suited for use as a hardening agent for polyepoxides.

Tolylenediamine which is otherwise desirable for use as a hardening agent for polyepoxides, that is, epoxides having an average of more than one vicinal epoxy group per molecule, is deficient in that it discolors and/or stains the polyepoxide to which it is added. The discoloration and/or staining effected by the tolylenediamine is occasioned by the poor color stability of the tolylenediamine. When first produced, tolylenediamine is substantially colorless. Subsequently, tolylenediamine darkens quite rapidly and its staining characteristics become more pronounced as it is exposed to air, light and/or elevated temperatures.

According to the present invention, the color stability of tolylenediamine is substantially improved and the staining characteristics thereof substantially eliminated by the addition thereto of an ascorbic acid.

The amount of ascorbic acid used is about 0.05 percent by weight to about 5 percent by weight and preferably about 0.25 percent by weight to about 1 percent by weight based on the weight of the tolylenediamine.

Ascorbic acid as used herein is intended to encompass ascorbic acid and isoascorbic acid and mixtures thereof.

The term tolylenediamine as used herein is intended to encompass all isomers and mixtures thereof including 3,5-diaminotoluene, 2,4-diaminotoluene, 2,6-diaminotoluene, 2,3-diaminotoluene, 2,5-diaminotoluene, and 3,4-diaminotoluene and as stated mixtures thereof.

The addition of an ascorbic acid to tolylenediamine can be carried out as is set forth in the examples of this application.

The following examples illustrate the present invention and are not intended to limit the scope thereof in any manner.

In carrying out the test procedures noted above, the tolylenediamine was distilled under a pressure of 2–3 mm. Hg into a flask which was at a temperature of 90° C. The stabilizer was then added to the contents of the flask while the flask was maintained at a temperature of 90° C. Test samples were then poured into aluminum foil lined trays and allowed to solidify. The solidified material was then broken into flakes $\frac{1}{16}$ to $\frac{1}{8}$ of an inch thick.

Discoloration Test

Flakes were placed in a loosely covered wide mouth bottle and exposed to sunlight by being placed on a window sill. Visual examinations were made for color changes.

Staining Test

Flakes were placed in a small pan and white tissue paper placed on top of the flakes, in direct contact therewith. Staining was determined by visual examination of the white paper.

As previously stated, the stabilized tolylenediamines of this invention can be used as hardening agents to cure polyepoxides to infusible products.

The amount of tolylenediamine used to provide curable polyepoxide compositions is sufficient to cure the polyepoxide compositions to infusible products. As a rule, the amount of tolylenediamine used ranges from about 70 percent of stoichiometric to about 10 percent in excess of stoichiometric. For purposes of stoichiometric calculations, one epoxy group is deemed to react with one amino hydrogen atom.

Suitable polyepoxides such as diglycidylether of 2,2-bis(p - hydroxyphenyl)propane are enumerated in U.S. Patent 3,316,185 to N. H. Reinking issued Apr. 25, 1967, the disclosure of which is incorporated herein by reference. The curable polyepoxide compositions can be used as potting compositions, encapsulating compositions and the like, as is well known in the epoxy art.

What is claimed is:

1. Tolylenediamine stabilized with ascorbic acid in an amount of about 0.05 to about 5 percent by weight based on the weight of said tolylenediamine, said stabilized tolylenediamine having improved resistivity to discoloration and staining.

2. A composition as defined in claim 1 wherein the said ascorbic acid is present in an amount of about 0.25 to about 1 percent by weight based on the weight of said tolylenediamine.

3. A composition as defined in claim 1 wherein the said ascorbic acid is isoascorbic acid.

4. A composition as defined in claim 1 wherein the said ascorbic acid is ascorbic acid.

5. A composition as defined in claim 1 wherein said tolylenediamine is a mixture of 2,4-diaminotoluene and 2,6-diaminotoluene.

| | Stabilizer (wt. based on tolylenediamine) | Tolylenediamine | Color after— | | | Stain after— | |
|---|---|---|---|---|---|---|---|
| | | | 4 hrs. | 3 days | 2 wks. | 3 days | 2 wks. |
| Example 1 | 0.1 percent by weight ascorbic acid. | 80 parts by wt. 2,4-diaminotoluene per 20 parts by wt. 2,6-diaminotoluene. | White | Yellow | | Yellow | |
| Example 2 | 0.25 percent by weight ascorbic acid. | do | do | Pale yellow | Yellow | Pale yellow | Yellow. |
| Example 3 | 0.5 percent by weight ascorbic acid. | do | do | do | do | do | Do. |
| Example 4 | do | 2,4-diaminotoluene | do | do | do | do | Do. |
| Example 5 | 0.5 percent by weight isoascorbic acid. | 80 parts wt by 2,4-diaminotoluene per 20 parts by wt. 2,6-diaminotoluene. | do | do | do | do | Do. |
| Example 6 | do | 2,6-diaminotoluene | | | | | |
| Control 1 | No stabilizer | 80 parts by wt. 2,4-diaminotoluene per 20 parts by wt. 2,6-diaminotoluene. | do | do | do | do | Do. |
| Control 2 | 0.5 percent by weight stannous octoate. | do | White | Brown | Black | Brown | |
| Control 3 | 0.5 percent by weight bismuth subsalicylate. | do | do | Dark brown | do | do | |

6. A composition as defined in claim 1 wherein said tolylenediamine is 2,4-diaminotoluene.

7. A composition as defined in claim 1 wherein the said tolylenediamine is 2,6-diaminotoluene.

References Cited

UNITED STATES PATENTS 2,927,136  3/1960  Schenck _____ 260—578
3,138,641  6/1964  Powers _____ 260—578
3,415,891  12/1968  Turumaru et al. ____ 260—578X CHARLES B. PARKER, Primary Examiner R. L. RAYMOND, Assistant Examiner U.S. Cl. X.R.

260—47, 582

UNITED STATES PATENT OFFICE
CERTIFICATE OF CORRECTION

Patent No. 3,595,918  Dated July 27, 1971

Inventor(s) George A. Salensky

It is certified that error appears in the above-identified patent and that said Letters Patent are hereby corrected as shown below:

In the table; "Example 6-----do-----2,6-diamino-toluene" should read --Example 6-----do-----2,6-diamino-toluene-----do-----do-----do-----do-----Do.--

In the table; "Control 1-----No stabilizer-----80 parts by wt. 2,4- -----do-----do-----do-----do-----Do. diaminotoluene per 20 parts by wt. 2,6-diaminotoluene."

should read

--Control 1-----No stabilizer-----
80 parts by wt. 2,4-  ----- Brown -----Black ----- Black
diaminotoluene per 20
parts by wt. 2,6-
diaminotoluene.--

Column 2, line 43; "olylenediamine" should read --tolylenediamine--

Signed and sealed this 11th day of April 1972.

(SEAL)
Attest:

EDWARD M. FLETCHER, JR.          ROBERT GOTTSCHALK
Attesting Officer                Commissioner of Patents